United States Patent [19]

Koos, Jr. et al.

[11] Patent Number: 4,593,278

[45] Date of Patent: Jun. 3, 1986

[54] REAL TIME GRAPHIC PROCESSOR

[75] Inventors: William M. Koos, Jr.; Timothy R. Geis, both of Orlando; Richard M. Rudy, Jr., Longwood, all of Fla.

[73] Assignee: Burroughs Corp., Detroit, Mich.

[21] Appl. No.: 425,206

[22] Filed: Sep. 28, 1982

[51] Int. Cl.⁴ .......................... G09G 3/20; G09G 1/16
[52] U.S. Cl. .................................... 340/748; 340/744;
340/747; 340/731
[58] Field of Search ............... 340/731, 732, 735, 744, 340/747, 748, 749, 750

[56] References Cited

U.S. PATENT DOCUMENTS

| | | | |
|---|---|---|---|
| 4,127,849 | 11/1978 | Okor | 340/747 |
| 4,231,096 | 10/1980 | Hansen et al. | 340/730 |
| 4,254,409 | 3/1981 | Busby | 340/750 |
| 4,297,694 | 10/1981 | Matherat | 340/748 |
| 4,345,245 | 8/1982 | Vella et al. | 340/748 |
| 4,371,872 | 2/1983 | Rossman | 340/744 |
| 4,439,761 | 3/1984 | Fleming et al. | 340/747 |
| 4,482,893 | 11/1984 | Edelson | 340/747 |

Primary Examiner—Gerald L. Brigance
Attorney, Agent, or Firm—Mervyn L. Young; David G. Rasmussen; Kevin R. Peterson

[57] ABSTRACT

A real time graphic processor is disclosed which processes graphic cell specifications on a scan line-by-line basis to generate pixel data. The pixel data from each cell specification is assembled to form a completed scan line of pixel data which is used to modulate a printing element, such as a laser diode. The invented graphic processor contains a special purpose cell specification processor which, in addition to generating the pixel data, modifies the cell specification by substituting new horizontal location and cell height indicator values. The modified graphic cell specification is then recirculated to the cell specification processor memory for processing the next scan line.

10 Claims, 11 Drawing Figures

PIXEL DOT LOCATION

SCAN LINE

| SCAN LINE | CURRENT HL (INT.+FRAC.) | COTAN θ | HL NEW (INT.+FRAC.) | HL INT. |
|---|---|---|---|---|
| 1 | 2 | – | – | – |
| 2 | 2 | .5 | 2.5 | 2 |
| 3 | 2.5 | .5 | 3 | 3 |
| 4 | 3 | .5 | 3.5 | 3 |
| 5 | 3.5 | .5 | 4 | 4 |

| FIG.7A | FIG.7B |
| --- | --- |
| FIG.7C | FIG.7D |

REAL TIME GRAPHIC PROCESSOR

BACKGROUND OF THE INVENTION

1. Field of the Invention

The invention relates to the real time processing of graphic cell specifications to generate printed vector graphics. More particularly, the invention relates to a cell specification processor which processes a graphic cell specification for a particular scan line and then modifies the cell specification by substituting new values for several identifier fields. These new values allow the modified cell specification to be recirculated and used to calculate pixel data for a subsequent scan line.

2. Description of the Prior Art

This application relates to and is an improvement of a copending application entitled REAL TIME CELL SPECIFICATION PROCESSOR by William Koos, Timothy Geis, and Richard M. Rudy, which has been filed of even date herewith, commonly assigned and incorporated by reference. That application describes a processor which generates character fonts and logos from cell specifications. The current application discloses a cell specification processor which can process graphic cell specifications to generate vector graphics. The generated vector graphics (i.e. diagonal lines) can be used as elements in printing circles or any desired design.

The invented cell specification processor utilizes a technique which eliminates cumulative error. Prior art methods use rise over run calculation methods which will result in cumulative error. Under the prior art method, for each successive scan line, an image is generated using a constant horizontal displacement, i.e. for each scan line drop the horizontal location of the pixel image is moved over a constant horizontal displacement. In an analogue system the actual horizontal displacement of the pixel image can exactly equal the desired constant horizontal displacement and no cumulative error will result. However, when the horizontal scan line is divided into a descrete number of dot locations a constant horizontal displacement ratio (e.g. a run of three dots for a rise of one scan line) will result in an accumulating error. This is because the horizontal displacement per scan line is not a constant for the total length of a line segment when we approximate the line to the nearest discrete dot position.

SUMMARY OF THE INVENTION

The present inventors recognized the need for a specialized processor which could process graphic cell specifications and, in real time, generate digital pixel data (i.e. logical "1's" or "0's") to modulate a laser diode printer. The processor would have to pulse the laser diode "on" or "off" at descrete dot locations as the laser diode scanned the printed element.

The inventors also recognized that the constant horizontal displacement technique, taught by the prior art, could only be used if the printed lines were broken into many smaller segments, each having a cell specification. For many angles, this would result in the processing of a prohibitive volume of cell specifications per line, taxing the available memory and requiring too much real time to transfer such a volume of graphic cell specifications to the cell specification processor and generate pixel dots.

To solve these problems the inventors developed a specialized graphic call specification processor which generates pixel data and calculated horizontal location displacement for each cell specification on a scan line-by-line basis.

The graphic processor contains an input processor which receives xy coordinates and line thickness data from a host and generates a cell specification containing several identifier fields. An intermediate processor orders the cell specifications by scan line of first appearance. A cell specification processor and a dot line processor process the graphic cell specifications in real time, and on a scan line-by-line basis generate pixel data which modulates the laser diode.

The cell specification processor processes graphic cell specifications for a particular scan line and then modifies that cell specification by substituting new horizontal location and decremented cell height value. The new horizontal location value allows the modified cell specification to be recirculated and be used to calculate pixel data for a subsequent scan line. The decremented cell height allows determination of completion of the cell specification. The cell spec processor calculates the new horizontal location indicator value on a scan line-by-line basis. A horizontal position reconstituting means calculates the horizontal location displacement in integer and fractional dot displacement values dependent on the cell specification angle indicator. The integer and fractional horizontal location displacement value is added to the current horizontal location indicator value which is also an integer and fractional value. A new horizontal location value is thus generated which has both integer and fractional dot displacement components. Although the cell specification processor only uses the integer value of the horizontal location indicator to generate pixel data, the fractional value is retained as a running total.

The invented cell specification processor produces graphic pixel data and eliminates accumulative error by recalculating the horizontal location for each cell spec on a scan line by scan line basis and retaining the fractional component of dot displacement.

DETAILED DESCRIPTION OF THE PREFERRED EMBODIMENT

Figure 1:
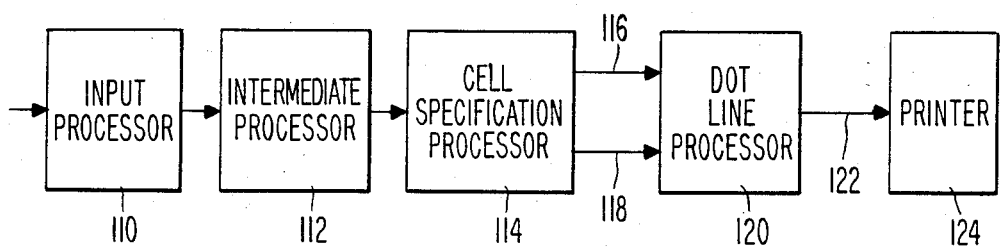
FIG. 1 is a block diagrammatic view of the real time graphic processor.

An apparatus for real time graphic generation is outlined in FIG. 1. The apparatus is generally composed of an input processor 110 which receives xy coordinates or point vector data and line thickness data from a host and generates a graphic cell specification containing angle ($\theta$), cell width (CW), cell height (CH), and starting integer horizontal location (HL) indicators. An intermediate processor 112 receives tabular data from the input processor 110 these tables may contain alpha numeric data as well as graphic data and develops cell specifications in order by scan line. The cell specification processor 114 receives the cell specification string from the intermediate processor 112, and on a line-by-line basis, performs the following operations: (a) generates pixel data commands which indicate to the dot line processor 120 the number of dots (ND) of pixel data generated from a particular graphic cell specification and its horizontal placement along the scan line (BA); (b) calculates new cell specification indicator values so that the modified cell specification will carry information needed for processing the next scan line; and, (c) recirculates the modified cell specification for use in the next scan line if it remains active on that scan line.

A dot line processor 120 connects to the cell specification processor 114 and receives number of dots (ND) 116 and horizontal placement (BA) 118 pixel commands for each cell specification as it is processed for a particular scan line and assembles this data into a composite array of pixel data. This array of pixel data is sent along buss 122 and modulates the printer 124 as it scans a particular scan line. The printer 124 can be any type of impact or non-impact printer which produces an image by sequentially printing pixel data (logical ones or zeros) for each scan line. The cell specification processor 114 and the dot line processor 120 each generate the pixel data string in real time and are synchronized with the scanning of the printing element.

Figure 2:
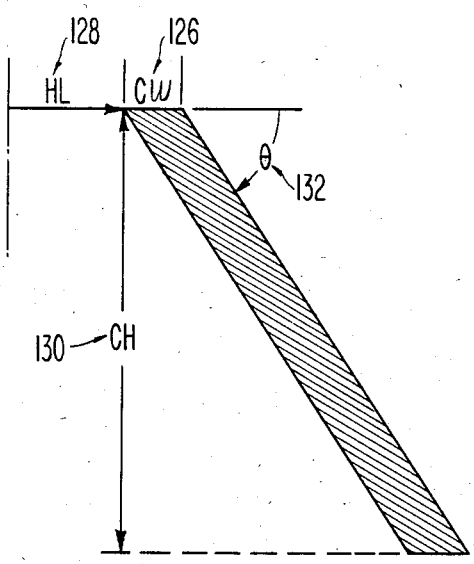
FIG. 2 shows a typical diagonal line and the various descriptive indicators.

FIG. 2 shows a typical diagonal line capable of being processed by the invented real time graphic processor and indicates the various descriptive indicators.

Figure 3:
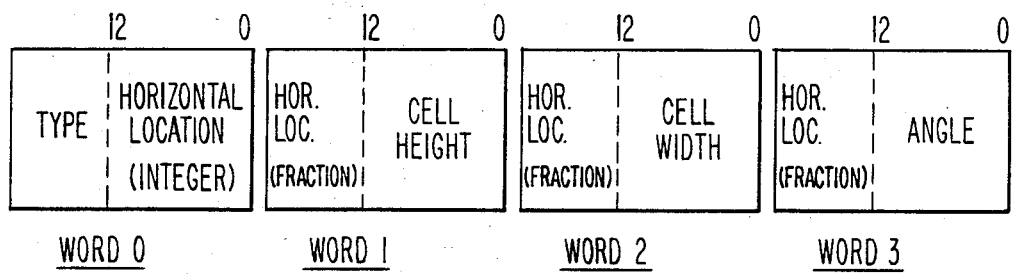
FIG. 3 shows the indicator fields for the graphic cell specification.

FIG. 3 shows a typical graphic cell specification. The cell width indicator (CW) 126 indicates the width of the diagonal line in pixel dots. The cell width indicator (CW) is loaded into bits 0 through 11 of word two (see FIG. 3) and indicates the dot width in the terms of the number of sixteen bit words and the number of dots to be printed in the last of those sixteen bit words. The horizontal location indicator (HL) contains both integer and fractional values. The integer value indicates the number of dots in the horizontal displacement, whereas, the fractional component indicates additional displacement which is a fraction of a dot. The fractional value is carried to prevent accumulative error. The integer value of the horizontal location (HL integer) is placed in word zero and the fractional horizontal location (HL fractional) is placed in the four most significant bits or words one through three. The horizontal location indicator (HL) initially contains the horizontal displacement of the origin of the graphic line. However, the horizontal location indicator (HL) is updated at the end of each scan line calculation with a new horizontal location needed to generate pixel data on the next scan line. The cell height indicator (CH) 130 is shown in FIG. 2 and indicates the scan line length of the diagonal line. The cell height indicator (CH) is stored in the least twelve significant bits of word one. The cell height indicator (CH) is decremented after each scan line and the new value replaces the previous cell height value. When the cell height (CH) equals zero, the cell specification processor knows that the diagonal line is complete and the cell specification should not be recirculated for use on a subsequent scan line. The angle indicator ($\theta$) 132 is shown in FIG. 2 and is stored in the lower twelve significant bits of word three. It should be noted that bit and word assignments are for clarity purposes only and could easily be redefined.

Figures 4, 5:
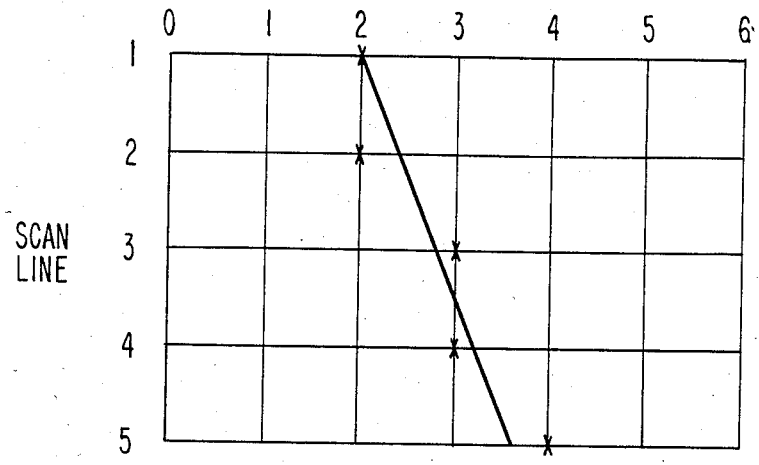
FIG. 4 is a graph showing how the pixel data approximates a diagonal line without accumulative error.
FIG. 5 is a table illustrating sample calculations made by the cell specification processor.

The graph in FIG. 4 and the table in FIG. 5 illustrate the calculations involved in reconstituting the horizontal location indicator (HL) for each succeeding scan line. The following trigonometric relationship is used in this calculation:

$$HL\ integer_{new} + HL\ fractional_{new} = HL\ integer_{old} + HL\ fractional_{old} + COT\ \theta$$

Where: HL integer$_{new}$+HL fractional$_{new}$ is the new horizontal location indicator value for the next scan line; HL integer$_{old}$+HL fractional$_{old}$ is the horizontal location value of the scan line just processed; and, Cotangent $\theta$ is the contangent value of the angle indicator ($\theta$) and is normalized such that its value indicates the change in horizontal displacement for change in vertical displacement. This change shall be referred to as the integral and fractional horizontal location displacement [$\Delta$HL integer+$\Delta$HL fraction].

The above relationship is used to calculate a new horizontal location for subsequent scan lines. As mentioned previously, the new horizontal location value is substituted into the horizontal location indicator, and the modified cell specification is recirculated for use in the subsequent scan line. The horizontal location for the next scan line (HL integer) is the integer value of dots and is stored in the lowest significant bits of the word zero. The fractional horizontal location value (HL fractional) is carried and used in calculating the horizontal location for the next succeeding scan line.

It is important to note that this method will eliminate cumulative error. The method is continuously correcting because for each scan line, the precise horizontal location is calculated and is stored in the modified cell specification as an integer and fractional value.

In the sample calculation shown in FIGS. 4 and 5, we are generating pixel data for a diagonal line having the following characteristics: HL integer=2, CW=1 dot, CH=four scan lines, $\theta$=60°, HL fractional=zero. As can be seen from FIG. 4, a pixel dot for the first scan line will be printed at HL integer=2; the second scan line will have an HL value equaling HL$_\theta$plus cotangent $\theta$ (2+$\frac{1}{2}$=2.5) and will print a pixel dot at HL integer=2. The third scan line will have HL value equaling HL$_\theta$+cotangent $\theta$ (2.5+0.5=3), and will print a pixel dot at HL integer=3. The table in FIG. 5 shows the calculations of HL for subsequent scan lines, and the graph in FIG. 4 shows how the pixel dots approximate the diagonal line with no cumulative error. It should be noted that alternative formulas could be used with trigonometric functions other than the cotangent.

Figure 6:
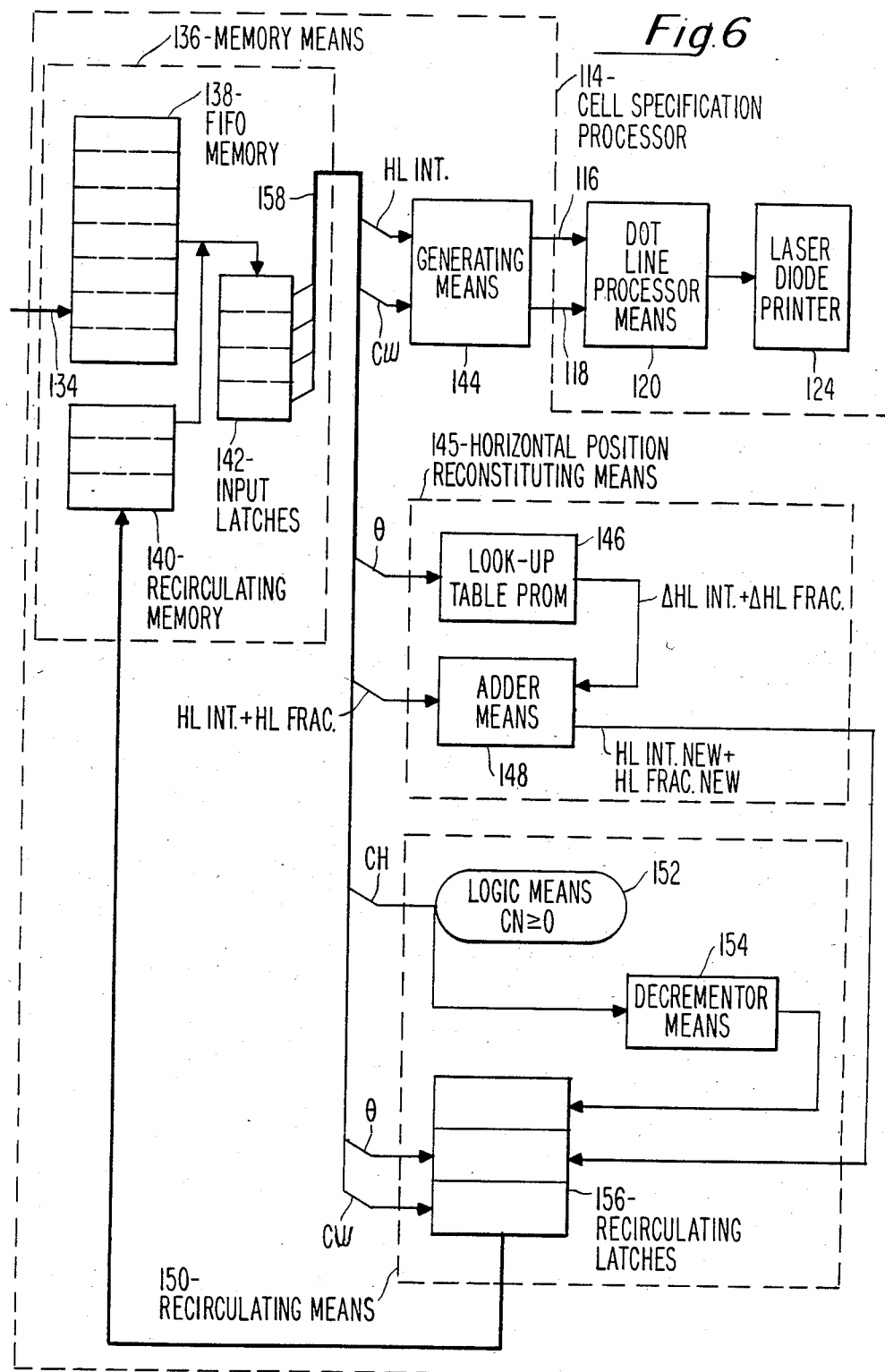
FIG. 6 is a block diagrammatic view of the cell specification processor.

FIG. 6 shows, in block diagrammatic form, the cell specification processor 114. A string of cell specifications are received on buss 134 and loaded into the cell specification processor memory 136. As noted previously, the cell specifications from the intermediate processor are presented in order of scan line of first appearance, i.e. all cell specifications which become active for one scan line are received before cell specifications which become active for the next scan line. The cell specification processor memory 136 contains a FIFO memory 138 and a recirculating buffer 140. At the beginning of each new scan line, the recirculating buffer 140 is checked to determine if any cell specifications are recirculated from the previous scan line. If no cell specifications were recirculated, then the cell specifications from the current dot line are read one at a time from the first-in-first-out (FIFO) memory 138 into the cell specification processor latches 142 and operated on by the cell specification processor. If cell specifications were recirculated, the cell specifications are read one at a time from the recirculating buffer 140 into the cell specification processor latches 142 and operated on by the cell specification processor until an end-of-scan-line specification is encountered. Then, cell specifications are read one at a time from the FIFO memory 138 into cell specification latches 142 and are operated on until an end-of-scan-line specification is encounted in the FIFO memory. (An end-of-scan-line specification is generated by the intermediate processor and placed in the cell specification chain in such a manner as to indicate completion of a scan line.) When the end-of-scan line cell specification is encountered in the FIFO memory 138 and all the cell specifications for the current dot line have been read and operated on by the cell specification processor, then, the above-mentioned cycle starts again and processes the next scan line.

Once a graphic cell specification is read from the FIFO memory 138 or the recirculating buffer 140, it is placed in a series of input latches 142 and held there while it is operated on by the cell specification processor. The cell specification processor 114, as shown in FIG. 6, contains a generating means 144, a horizontal position reconstituting means 145 and a recirculating means 150. The horizontal position reconstituting means 145 further contains a look-up table ROM 146, and an adder means 148. The recirculating means further contains a comparator 152, a decrementing means 154, and a series of recirculating latches 156. The generating means 144 retrieves from the input latches 142 through long buss 158, the horizontal location integer identifier [HL integer] and the cell width identifier (CW) to generate pixel commands which are sent to the dot line processor 120. The pixel commands tell the dot line processor the bit address for the pixel data (BA) 116, and the number of dots of pixel ones (ND) 118 to be generated following the bit address locations (BA).

A look-up table ROM 146 is connected through buss 158 to one of the input latches 142 which holds the angle identifier ($\theta$). The ROM 146 receives the angle identifier ($\theta$) as an input and outputs an integer and fractional horizontal location displacement value [$\Delta$HL integeral+$\Delta$HL fractional]. The embodiment in our example stores cotangent $\theta$ tables which are used to determine the value of horizontal location displacement. An alternative embodiment is contemplated which does not use a look-up table, but actually calculates the horizontal location displacement value.

An adder 148 connects to the look-up ROM 146 and receives as input the integral and fractional horizontal location displacement. The adder 148 also connects to input latch 142 through buss 158 and receives as an input the integral and fractional horizontal location value. The adder 148 adds ($\Delta$HL integer+$\Delta$HL fractional) to (HL integer+HL fractional) and generates a new horizontal location indicator (HL integer$_{new}$+HL fractional$_{new}$) which will be used for the next succeeding scan line.

A recirculating means 150 receives as input indicator values for cell height (CH), angle ($\theta$) and cell width (CW) from the input latches 142 and also receives as input the new horizontal location value [HL integer$_{new}$+HL fractional$_{new}$] from the adder 148. The recirculating means 150 uses these indicator values to generate a modified cell specification which is to be processed on the next succeeding scan line and outputs the modified cell specification to the recirculating buffer 140 through buss 158. As mentioned earlier, the recirculating means 150 contains a comparator 152, a decrementor 154 and a series of recirculating latches 156. The comparator 152 receives as an input the value of the cell height indicator (CH) from the input latches 142 and determines if the value is greater than or equal to zero. If the value equals zero the cell specification is to be discarded and not recirculated. If the value of CH is greater than zero, the modified cell specification should be reconstituted and recirculated. The decrementor 154 also receives the value of CH from the input latch 142 and decreases its value by one. The recirculating latches 156 are loaded with the original value of $\theta$ and CW as stored in the input latch 142. The new decremented CH value is loaded from the decrementor 154 into the recirculating latch 156. The new horizontal location value (HL$_{new}$ integer+HL$_{new}$ fraction) is received from the adder means 148 and are loaded in the recirculating latches 156. The recirculating latches 156 are now loaded with new indicator values and the newly modified cell specification is sent along buss 158 and stored in the recirculating buffer 140 to be used when processing the next scan line.

In operation, each cell specification active on a particular scan line being processed, is latched one at a time into the input latches 142. The generating means 144 acquires (HL integer) and CW values from the input latches 142 and sends commands to the dot line processor means 120 which carry instructions on the placement and length of the pixel chain. In parallel with this operation, the look-up table ROM acquires the $\theta$ value from the input latches 142 and generates a ($\Delta$HL integer+$\Delta$HL fractional) value. The adder 148 adds this ($\Delta$HL integer+$\Delta$HL fractional) value obtained from ROM 146 with the ($\Delta$HL integer+$\Delta$HL fractional) value acquired from input latches 142 and calculates a new (HL$_{new}$integer+HL$_{new}$fractional) value which will be used when processing the cell specification on the next scan line. The (HL$_{new}$integer+HL$_{new}$fractional) value is loaded into the recirculating latches 156. The value of $\theta$ and CW are also acquired from the input latches 42 and are loaded directly into the recirculating latches 156 with no modifications. The CH indicator is acquired from the input latches 142 and tested by comparator 152 to determine if its value is greater than or equal to zero. If the value of CH is zero, the cell specification is discarded and not recirculated from the recirculating latches 156 to the recirculating buffer 140. If, however, the value of CH is greater than zero, the cell will remain active on the subsequent scan line. The value of CH is then decremented and the new CH value is loaded into the recirculating latch 156. The recirculating latch 156 contains all the indicators of a newly constituted cell specfication. The new cell specification is transmitted to the recirculation buffer 140 where it can be processed during the next scan line with other cell specifications previously loaded in the recirculation buffer 140 or the FIFO memory 138. The processing of that cell specification for the current scan line is complete. The input and recirculating latches 142, 156 are initialized and a new cell specification is loaded into the input latches 142 for processing. This cycle is complete when all the cell specifications active on a particular scan line have been processed by the cell specification processor.

The dot line processor 120 now assembles the pixel array generated by each cell specification into a scan line array of pixel data. The scan line array is released from the dot line processor memory as the printer scans across the page thereby modulating the printer element with pixel data. Processing in the cell specification processor 114 and dot line processor 120 is done in real time. The printer 124, shown in this embodiment, uses a laser diode which is pulsed off and on by the pixel data. As it is pulsed the laser diode produces an image on the page or on a photosensitive drum, as it scans across.

The process described above is repeated for each scan line. The cell specifications which have been recirculated with new values join the other cell specifications which are waiting in memory to be processed during the next scan line. On completion of all the scan lines, a complete composite image is created.

Figures 7, 7D:
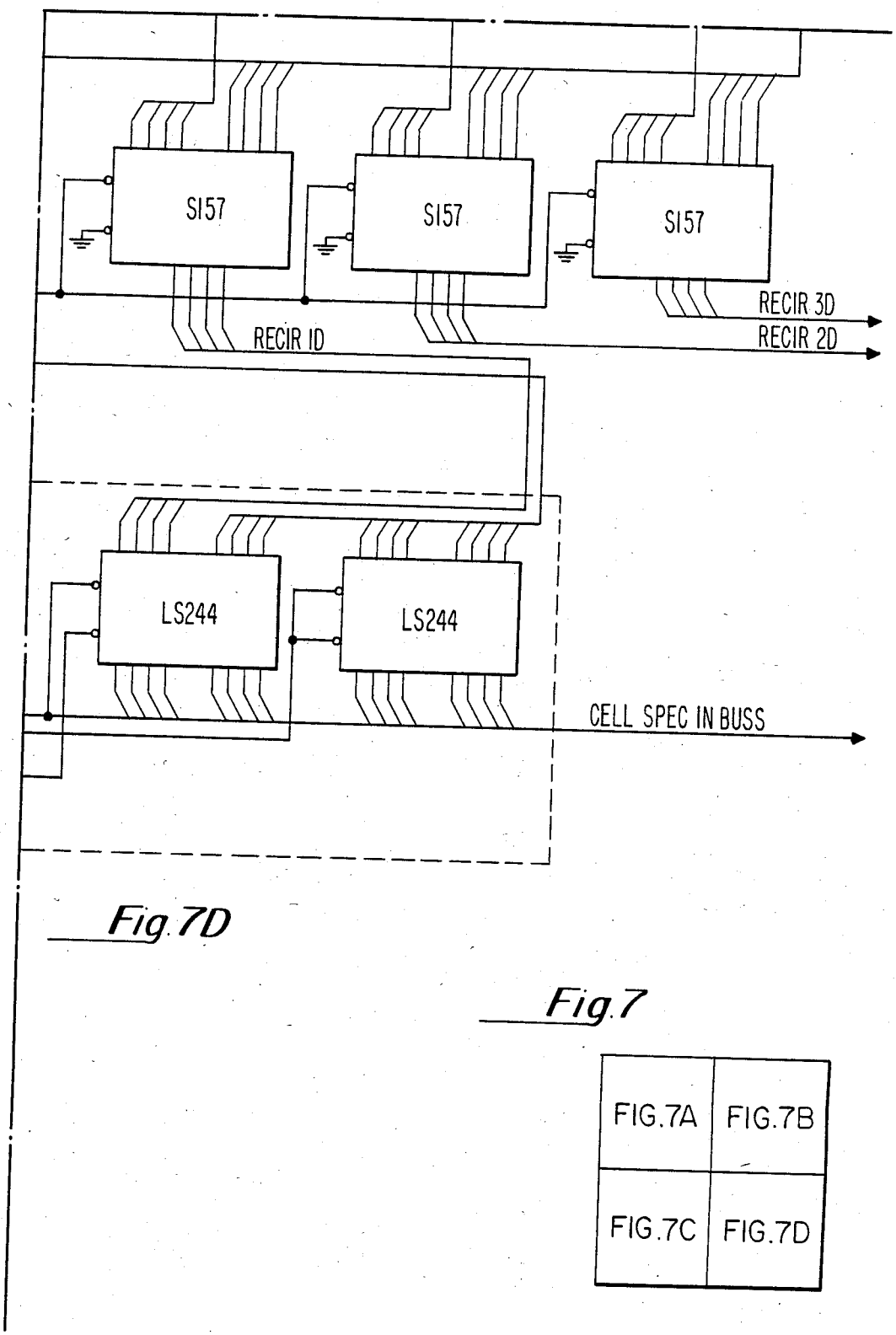
FIG. 7 is a circuit diagram showing the adding means and look-up table means for a specialized call spec processor.
Figure 7A:
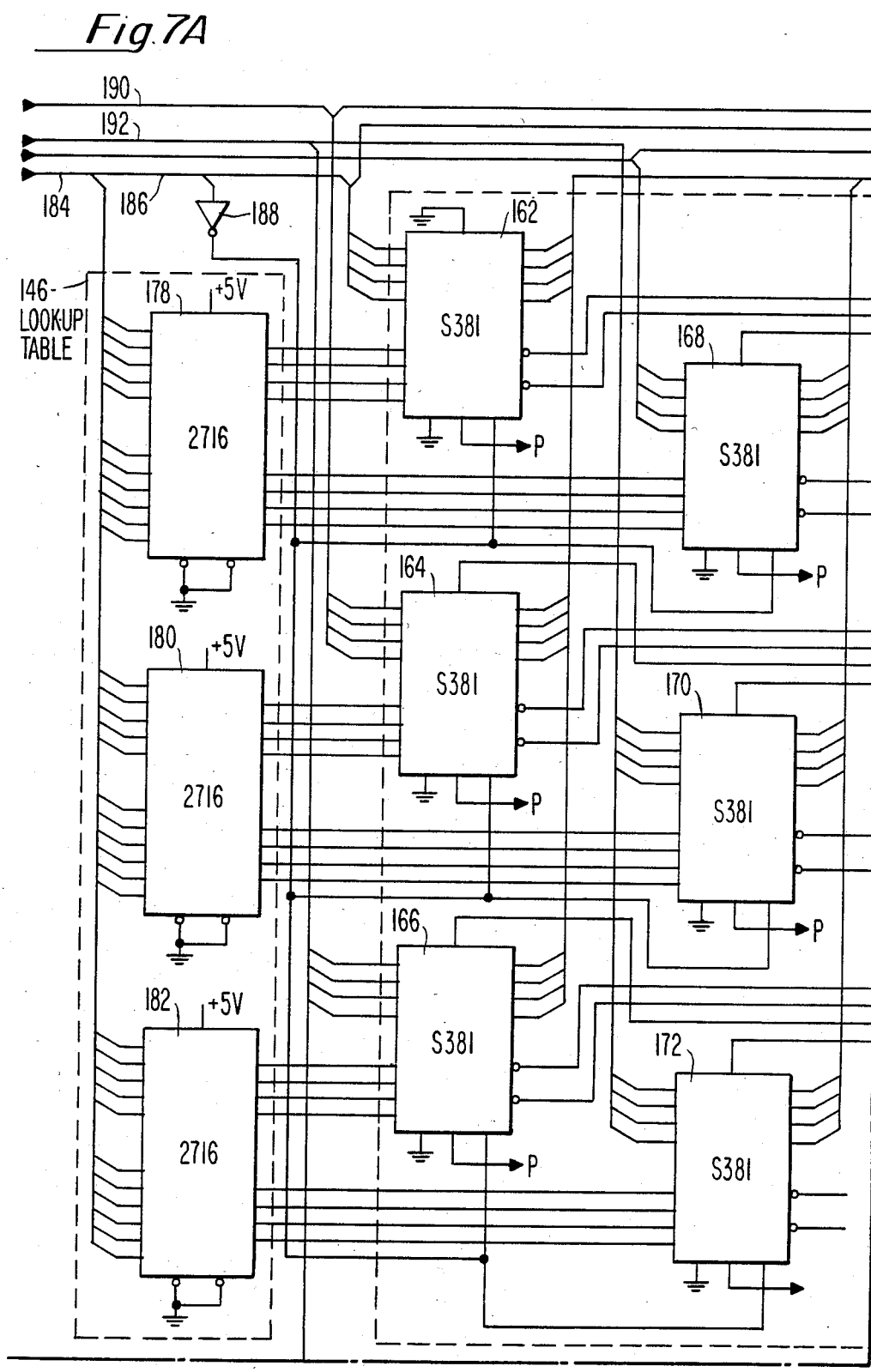
Figure 7B:
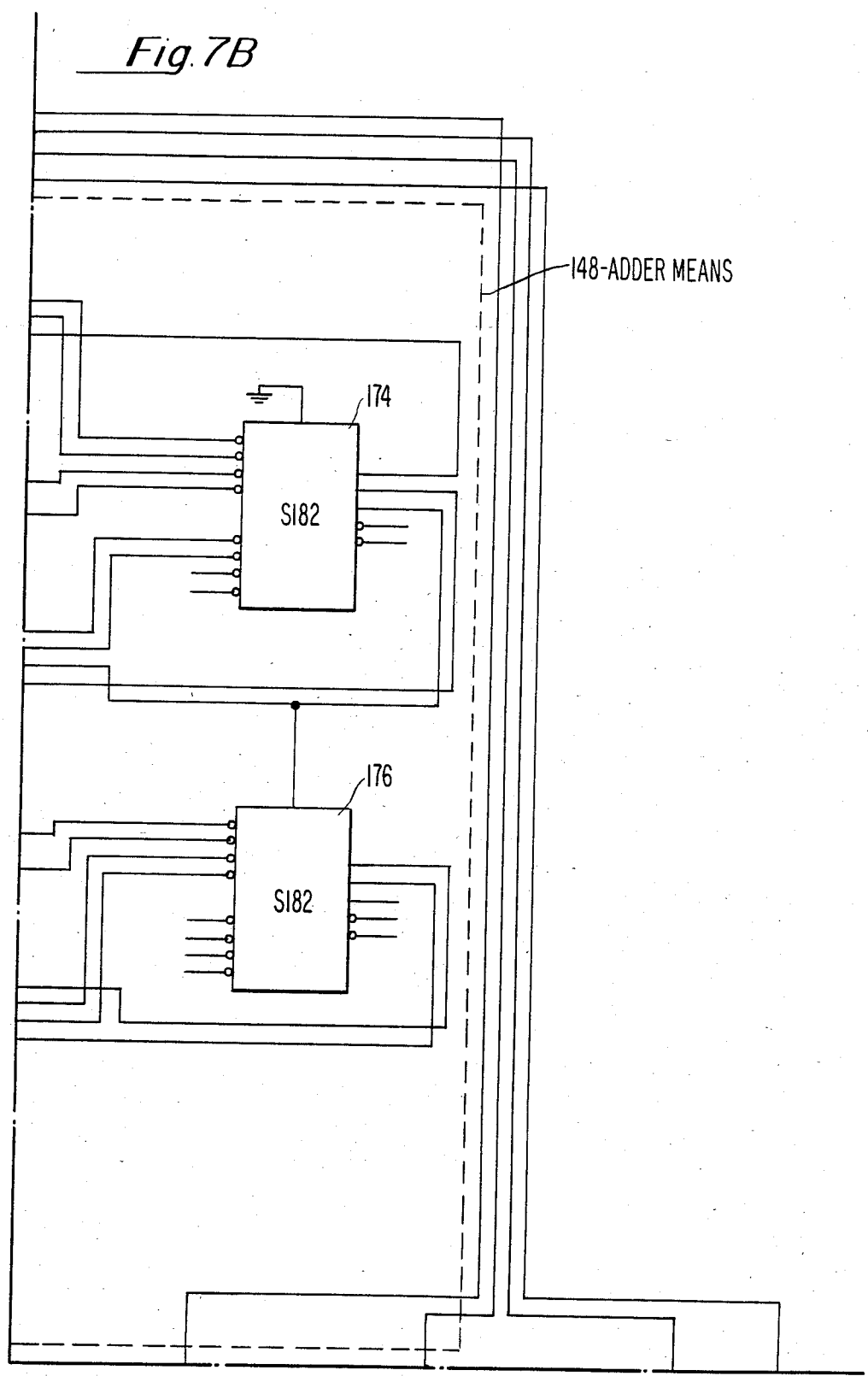
Figure 7C:
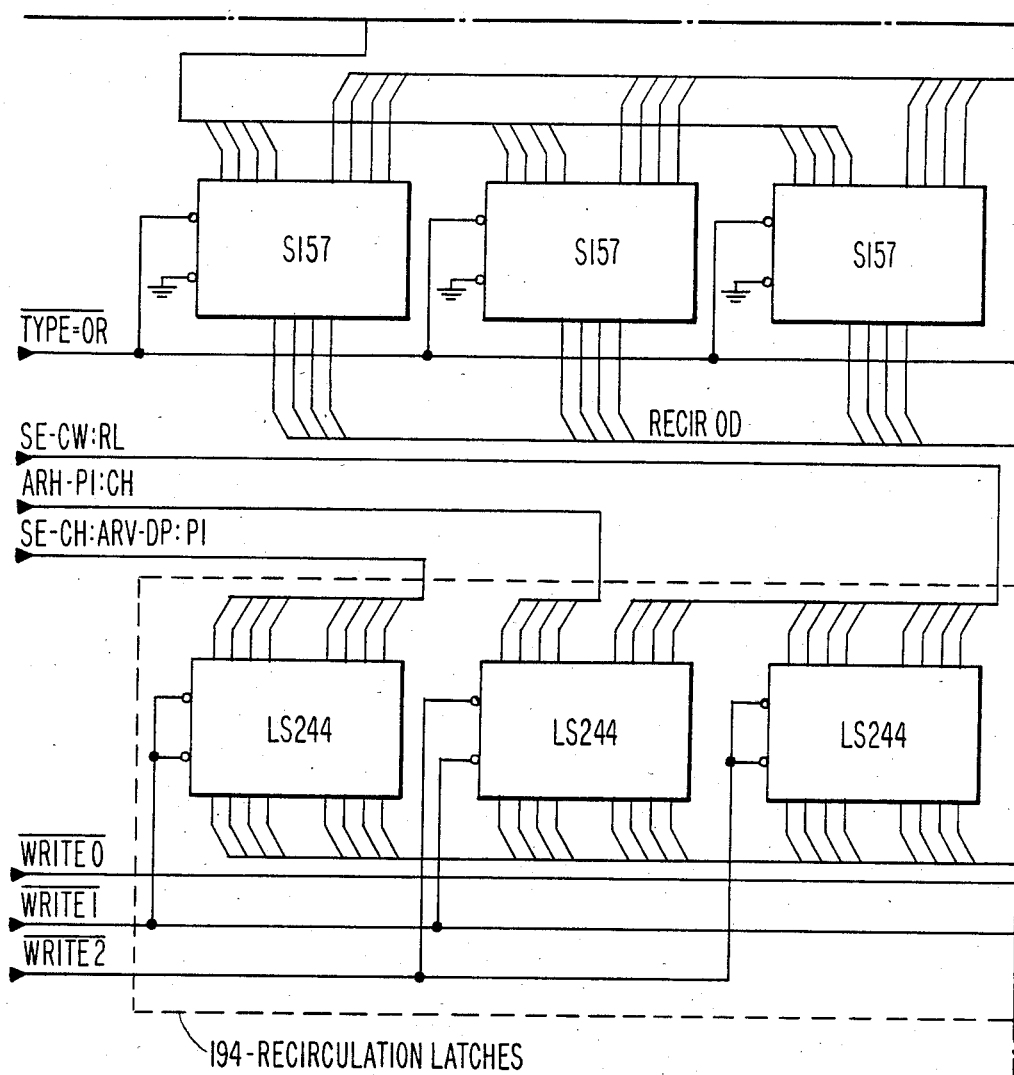

It should be understood that the above described cell specification processing circuit can be manifested in many forms depending on the desired speed of printing. (Since the cell specification processor and dot line processor are real time processors, the printing speed will be directly related to their combined calculating speed.) The memory means, input latch means, generating means, look-up table means, adder means, and recirculating means could be incorporated into a single general purpose microprocessor chip. This, however, would result in substantially reduced printing speed. The apparatus could be built from specific components fabricated specifically to increase calculation speed. FIG. 7 shows the adding means and look-up table means for such a specialized processor. As can be seen from FIG. 7, the adder means 148 is composed of six arithmetic units 162, 164, 166, 168, 170 and 172, and two look-ahead carry units 174, 176 which allow the arithmetic operation to proceed faster. The look-up table 146 contains three PROMs 178, 180 and 182 which receive the value of the angle indicator from buss 184. In order to reduce the memory requirements to store cotangent values in the three PROMs, a modification has been made so that only cotangent values are stored for angles from zero to 90°. This reduces circuit complexity and ROM memory, but requires additional initial processing by the input processor and requires a modification of the angle identifier field in the cell specification. In this embodiment the most significant bit in the angle field contains a sign bit which indicates whether the angle is clockwise or counter-clockwise from the horizon. The sign bit 186 goes to inverter 188 and then to the six arithmetic logic units 162, 164, 166, 168, 170 and 172 and determines whether the horizontal location displacement (HL integer+HL fraction) obtained from the three look-up table PROMs is to be added to or subtracted from the horizontal location identifier value.

The input processor has an additional software routine which determines the quadrant of the graphic line and assigns a sign bit. In addition, the input processor corrects for an anomaly which might appear when processing a line having a $\theta$ of zero degrees. In that case, the cell height value is substituted into the cell width indicator (CW) and the cell width value is substituted into the cell height indicator (CH). Such pre-processing by the microprocessor allows the invented cell specification processor, shown in FIG. 7, to process the cell specifications with greater speed, thereby, producing a faster print speed.

In operation, the sign bit and angle value data travel from the input latches along buss 184 to the three PROMs 178, 180 and 182. The PROMs contain a table of cotangent values corresponding to $\theta$ values and outputs the horizontal location displacement value to the six arithmetic logic units 162, 164, 166, 168, 170 and 172. Sign bit 186 is sent to inverter 188 and then to the six arithmetic units and determines whether the arithmetic units operate in the addition or subtraction mode. The six arithmetic units receive inputs from the PROMs 178, 180, 182, and receives the horizontal location integer and fractional values along busses 190 and 192. The arithmetic logic units are coupled with two look-ahead carry units to facilitage the calculation speed. The adder means 148 generates the new horizontal location indicator value which is loaded into the bank of recirculation latches 194 and ultimately recirculated to the recirculation memory.

It should be noted that the specialized microprocessor shown in FIG. 7 uses contangent values to determine the horizontal location displacement value. However, as noted previously, the inventors contemplate the use of other trigonometric relationships.

Obviously, many modifications and variations of the present invention are possible in the light of the above teachings. It is therefore the understanding that within the scope of the appended claims the invention may be practiced otherwise than as specifically described.

What is claimed is:

1. An apparatus to generate printed vector graphics, having initial processing which translates coordinate information from a host into cell specifications and orders said cell specifications by scan line of first appearance, said cell specifications having angle, cell height, cell width and integer and fractional horizontal location indicators, and having a real time processor to generate pixel date by processing said cell specifications on a scan line-by-scan-line basis, said real time processor comprising:
   a memory means for storing said cell specifications and for latching, one at a time in sequence, each of said cell specifications which said latched cell specifications are being processed for a particular scan line;
   a generating means, connected to said memory means, for generating pixel data from said latched cell specifications during a current scan line processing;
   a horizontal position reconstituting means, connected to said memory means, for determining from said angle indicator of said latched cell specification, the horizontal location displacement for the next scan line, and for adding said horizontal location displacement to said horizontal location indicator to produce a new horizontal location indicator value; and,
   a recirculating means, receiving said angle, cell width, and cell height indicators from said memory means, and said new horizontal location indicator value from said horizontal positioning reconstituting means, for reconstructing a modified cell specification to be circulated back to said memory means for processing for the next succeeding scan line.

2. The apparatus of claim 1 wherein said horizontal position reconstituting means comprises:
   a first means which receives said angle indicator value from said memory means for calculating said horizontal location displacement in integer and fractional dot displacement values; and, an adding means for adding said integer and fractional horizontal location displacement values received from said first means with said integer and fractional horizontal location indicator value received from said memory means to produce a new horizontal location indicator value having both integer and fractional components.

3. The apparatus of claim 2 wherein said first means consists of a trigonometric look-up table stored in a memory device, and a further means for looking up said horizontal location displacement values which corresponds to values of said angle indicator.

4. The apparatus of claims 1 or 2 wherein said recirculating means comprises:
   a decremental means, connected to said memory means, for decreasing by one the value in said cell height indicator;
   a latching means, loaded with indicator values from said memory means, said decremental means, and said horizontal position reconstituting means, for reconstructing a modified cell specification; and,
   a logical means for determining if said modified cell specification should be recirculated to said memory means or discarded.

5. The apparatus of claim 2 wherein said first means determines said horizontal location displacement in integer and fractional dot displacement values of sufficient significant bits to allow for desired print resolution and wherein said adding means produces said new horizontal location indicator value having similar significant bits so as to reduce roundoff error.

6. The apparatus of claim 3 wherein said trigonometric lookup table contains angle values and corresponding cotangent values.

7. The apparatus of claim 1 further comprising:
   a dot line processing means, connected to said generating means, for assembling a complete scan line of pixel data; and,
   an imaging means, connected to said dot line processor means, for composing an image from said pixel data.

8. An apparatus to generate printed vector graphics, having initial processing which translates coordinate information from a host into cell specifications and orders said cell specifications by scan line of first appearance, said cell specification having angle, cell height, cell width, and integer and fractional horizontal location indicators, and having a real time processor to generate pixel data by processing said cell specifications, on a scan line-by-line basis, said real time processor comprising:
   a memory means for storing said cell specifications and for latching, one at a time in sequence, each of said cell specifications which said latched cell specifications are being processed for a particular scan line;
   a generating means connected to said memory means, for generating pixel data from said latch cell specifications during a current scan line processing;
   a first look-up memory means, which receives said angle indicator value from said memory means, for calculating the horizontal location displacement in integer and fractional dot displacement values;
   an adding means for adding said integer and fractional horizontal location displacement value received from said first look-up memory means with said integer and fractional horizontal location indicator value received from said memory means to produce a new horizontal location indicator value having both integer and fractional components;
   a decremental means, connected to said memory means, for decreasing by one the value in said cell height indicator;
   a latching means, located with indicator values from said buffer means, decremental means, and adding means, for reconstructing a modified cell specification;
   a logical means for determining if said modified cell specification should be recirculated to said memory means or discarded;
   a dot line processor means, connected to said generating means, for assembling a complete scan line of pixel data; and,
   an imaging means, connected to said dot line processing means, for composing an image from said pixel data.

9. A microprocessor for the real time generation of printed vector graphics, comprising:
   input processor means to receive xy coordinates and line thickness data from a host, for generating a cell specification containing angle, cell width, cell height, and integral and fractional horizontal location indicators;
   an intermediate processor means to receive said cell specifications from said input processor means for ordering said cell specifications by scan line of first appearance;
   a cell specification processor means, to receive said cell specifications from said intermediate processor means for generating pixel data commands for each scan line, and for reconstituting and recirculating said cell specifications for processing in subsequent scan lines, said cell specification processor means having:
   a memory means for storing said cell specifications while active and for latching in sequence said cell specifications which said cell specifications are being processed for a particular scan line;
   a generating means, which receives said latched cell specifications from said memory means, for generating commands during a current scan line processing which commands indicate the length and starting address of the pixel string;
   a first means connected to said memory means for determining, from said angle indicator, the horizontal location displacement for the next scan line;
   an adding means connected to said memory means and said first means, for adding said horizontal location displacement to said horizontal location indicator value to produce a new horizontal location value;
   a decremental means, connected to said memory means, for decreasing the value of said cell height indicator; and,
   a recirculating means connected to said decremental means, said adding means and said memory means, for recirculating back to said memory means a modified cell specification if said modified cell specification remains active for the next succeeding scan line;
   a dot line processing means, connected to said cell specification processor means, to receive said pixel data commands for each cell specification processed by said cell specification processor means, for generating an ordered scan line of pixel data; and, an imaging means, connected to said dot line processing means for composing an image from said scan line of pixel data.

10. Method for generating printed vector graphics having initial processing which translates coordinate information from a host into cell specifications and orders said cell specifications by scan line of first appearance, said cell specifications having angle, cell height, cell width, and integer and fractional horizontal location indicators, and having real time processing to generate pixel data, on a scan line by scan line basis, the steps of said real time processing comprising:

latching, one at a time in sequence, each of said cell specifications which said latched cell specifications are being processed for a particular scan line;

generating pixel data from said latched cell specifications during a current scan line processing;

calculating the horizontal location displacement in integer and fractional dot displacement values based on said angle indicator value from said latched cell specification;

adding said integer and fractional horizontal location displacement value to said integer and fractional horizontal location indicator value obtained from said latched cell specification to produce a new horizontal location indicator value having both integer and fractional components; and, reconstructing a modified cell specification by substituting said new horizontal location indicator value into said latched cell specification and recirculating said modified cell specification for processing on a next succeeding scan line after testing to determine whether said modified cell specification will remain active on said next succeeding scan line.

* * * * *